Oct. 14, 1930.  E. G. GARTIN  1,778,553
ROCK DRILL
Filed Aug. 22, 1928
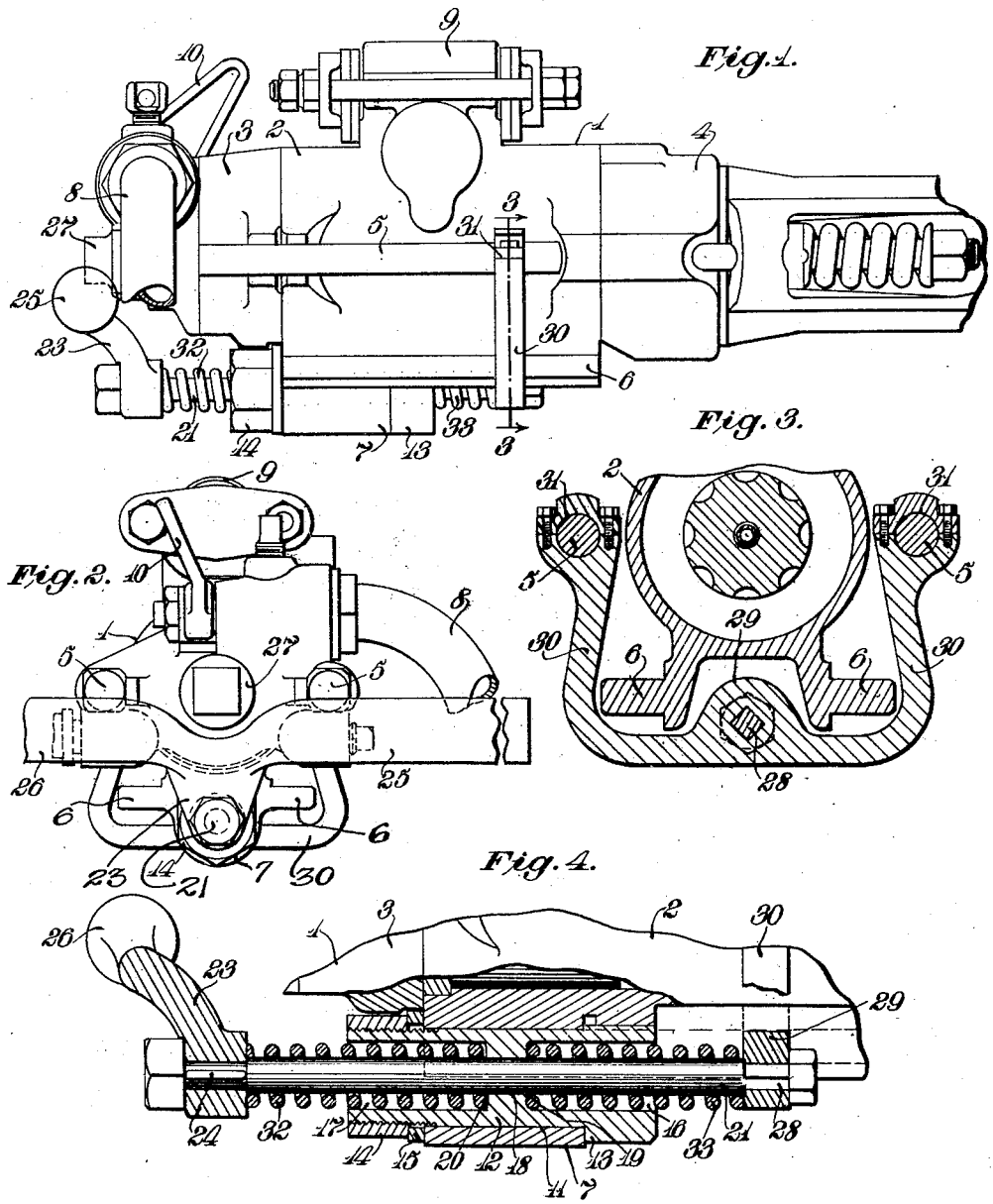
Inventor:
Elmer G. Gartin.
by Luis A. Maxson.
Atty.

Patented Oct. 14, 1930

1,778,553

UNITED STATES PATENT OFFICE

ELMER G. GARTIN, OF CLAREMONT, NEW HAMPSHIRE, ASSIGNOR TO SULLIVAN MACHINERY COMPANY, A CORPORATION OF MASSACHUSETTS

ROCK DRILL

Application filed August 22, 1928. Serial No. 301,293.

My invention relates to rock drills, and more particularly to handle mechanisms for rock drills of the drifter or shell mounted type by means of which such drills may be used as hand drills for sinking and other purposes.

An object of my invention is to provide an improved handle mechanism for rock drills. A more specific object of my invention is to provide an improved handle mechanism for attachment to a "drifter" drill for the purpose of enabling the same to be used as a hand drill and at the same time permitting the operator to handle the heavy drill with a minimum of shock and vibration. Other objects and advantages of the invention will hereinafter more fully appear.

In the accompanying drawings, in which I have shown for purposes of illustration one illustrative embodiment of my invention, Fig. 1 is a side elevation, with parts broken away, of a drifter drill fitted in accordance with the illustrative embodiment of the invention.

Fig. 2 is a fragmentary rear end view of the mechanism shown in Fig. 1.

Fig. 3 is a vertical section on the line 3—3 of Fig. 1.

Fig. 4 is a fragmentary central vertical longitudinal section showing a part of the handle mechanism.

Referring to the accompanying drawings and first particularly to Figs. 1 and 2, it will be noted that the drill 1 comprises a cylinder 2, a rear head 3, a front head 4, side rods 5 holding the parts in assembled relation, integral gibs or guides 6 for engagement with the guideways on a shell, and a feed nut boss 7 at the lower side of the head end of the drill. Motive fluid may be supplied to the drill through a fluid supply connection 8 and is distributed by a valve mechanism whose chest is shown at 9. Fluid supply to the drill is controlled by movements of a throttle valve handle 10.

Within the bore 11 of the feed nut boss 7 is mounted a sleeve member 12 having a head 13 preventing rotation and fitting against the front side of the boss, and a nut 14 with lock washer 15 secures the sleeve 12 rigidly in the feed nut boss. The sleeve 12 is provided with end chambers 16, 17 connected by a smaller passage 18, with the result that shoulders 19 and 20 are formed at the inner ends of the chambers. The passage 18 is circular in cross section and within the same a strong and rigid bar 21 is slidably mounted, this bar preferably being as large as is permitted by the space available. At its rear end the bar has rigidly secured thereto in nonrotative relation a handle 23. For the purpose of preventing relative rotation between the handle and the bar a key 24 is shown, but any other suitable form of connection can be employed. The handle 23 has oppositely extending grasping portions 25, 26 and is curved so as to permit ready access to the cleansing fluid supply mechanism which is located as indicated at 27. At its forward end 28 the bar 21 is made polygonal and has rigidly secured thereto a yoke member 29. The yoke member 29 has laterally and upwardly extending arms 30 each of which is provided with a split bearing 31 surrounding the side rods 5. The length of the arms is so proportioned that the bearings 31 may slide freely upon the side rods 5 as the bar 21 slides in the opening 18 in the sleeve 12. Springs 32 and 33 of suitable stiffness are arranged respectively between the handle member 23 and the shoulder 20 and between the yoke 29 and the shoulder 19.

From the foregoing description it will be evident that I have provided a very simple readily attachable and detachable handle attachment which enables ready conversion of drifting drills to "sinkers", and that by reason of the construction the operator, by grasping the handles 25 and 26, can easily and comfortably control the drill during operation, the springs 32 and 33 absorbing most of the vibration and the yoke 29 through its cooperation with the side rods 5 maintaining the drill at all times in the same general relation to the handles. It will further be evident that my improved handle mechanism can be attached and detached without making any alterations whatever in the parts of the drill proper, all that is necessary being to replace the feed nut by a sleeve, as indicated, and attach the other parts.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. The combination with a drifting drill having a feed nut boss and side rods, of a handle mechanism for adapting the drill to manual operation comprising a sleeve mounted in the feed nut boss of the drill, a rod slidably mounted in the sleeve and in non-rotative relation thereto carrying a handle at one end, resilient means on the rod on opposite sides of the sleeve for yieldingly limiting the movement of the rod, and means on the rod in non-rotative relation thereto and engaging the side rods of the drill for preventing angular movement of the rod relative to the sleeve.

2. The combination with a percussive drill of the drifter type having side rods and a feed nut boss, of a handle device for adapting the drill to manual operation comprising a guiding member secured to the feed nut boss, a rod slidably mounted in the guiding member and extending on opposite sides thereof, a handle secured to the rod at one end thereof in non-rotative relation thereto, coiled springs on the rod on opposite sides of the guiding member for yieldingly cushioning the movement of the drill relative to the handle, and a yoke attached to the other end of the rod in non-rotative relation thereto and slidably engaging the side rods and having a detachable connection with the latter.

3. The combination with a drill, of guiding means secured thereto in parallelism with the axis of the drill, a member slidable in and guided by said guiding means, a handle secured to said member in non-rotative relation thereto, an arm secured to the other end of said member, a guide secured to the end of said arm in non-rotative relation thereto, said drill having an element under tension for maintaining the parts thereof in assembled relation, said guide slidably engaging said element under tension, and spring means for resiliently maintaining said handle in a predetermined position relative to said drill.

4. The combination with a mounted drifter type percussive rock drill having a feed nut boss and side rods to hold the parts thereof together, of a spring handle attachment for adapting the drill to manual operation including a sliding connection attached to the feed nut boss, a manual grasping handle carried at one end of said sliding connection in non-rotative relation to the latter, resilient shock absorbing means associated with said sliding connection for absorbing shocks transmitted by said drill to said handle, and a guide device carried by the other end of said sliding connection in non-rotative relation thereto and slidably engaging said side rods for preventing angular movement of the handle attachment relative to the drill.

5. The combination with a mounted drifter type percussive rock drill having a feed nut boss and side rods to hold the parts thereof together, of a spring handle attachment for adapting the drill to manual operation including a sliding connection attached to the feed nut boss, a manual grasping handle carried at one end of said sliding connection in non-rotative relation to the latter, resilient double acting shock absorbing means associated with said sliding connection for absorbing shocks transmitted by the drill to said handle in opposite directions, and a guide device carried by the other end of said sliding connection in non-rotative relation thereto and slidably engaging said side rods for preventing angular movement of the handle attachment relative to the drill.

6. The combination with a mounted drifter type percussive rock drill having a feed nut boss and side rods to hold the parts thereof together, of a spring handle attachment for adapting the drill to manual operation including a sliding connection attached to and including an element extending centrally through the feed nut boss, a manual grasping handle carried at one end of said sliding connection in non-rotative relation to the latter, resilient shock absorbing means associated with said sliding connection for absorbing shocks transmitted by said drill to said handle, and a guide device carried by the other end of said sliding connection in non-rotative relation thereto and slidably engaging said side rods for preventing angular movement of the handle attachment relative to the drill.

7. The combination with a mounted drifter type percussive rock drill having guides adapted to slide in a guideway, a feed nut boss and side rods to hold the parts of the drill together, of a spring handle attachment for adapting the drill to manual operation including a sliding connection attached to and including an element extending centrally through the feed nut boss, a manual grasping handle carried at the rear end of said sliding connection in non-rotative relation to the latter and arranged adjacent the rear end of the drill, a resilient shock absorbing means associated with said sliding connection for absorbing shocks transmitted by the drill to the handle, and a guide device carried at the other end of said sliding connection in non-rotative relation to the latter and including a yoke having side portions passing outside of and around said drill guides partially encircling the drill body for slidably engaging said side rods for preventing angular movement of the handle attachment relative to the drill.

8. The combination with a mounted drifter type percussive rock drill having guides adapted to slide in a guideway, a feed nut boss and side rods to hold the parts of the drill together, of a spring handle attachment for adapting the drill to manual operation including a sliding connection attached to and including an element extending centrally through the feed nut boss, a manual grasping handle carried at the rear end of said sliding connection in non-rotative relation to the latter and arranged adjacent the rear end of the drill, a resilient double acting shock absorbing means associated with said sliding connection and disposed between the handle and the drill for absorbing shocks transmitted by the drill to the handle in opposite directions, and a guide device carried at the other end of said sliding connection in non-rotative relation to the latter and including a yoke having side portions passing outside of and around said drill guides partially encircling the drill body and slidably engaging said side rods for preventing angular movement of the handle attachment relative to the drill.

9. The combination with a mounted drifter type percussive rock drill having guides adapted to slide in a guideway, a feed nut boss and side rods to hold the parts of the drill together, of a spring handle attachment for adapting the drill to manual operation including a sliding connection attached to the feed nut boss and including a sliding bolt passing centrally through the feed nut boss, a manual grasping handle secured to the rear end of said bolt in non-rotative relation to the latter and arranged adjacent the rear end of the drill, a guide device secured to the opposite end of said bolt in non-rotative relation to the latter and including a yoke having side portions passing outside of and around the drill guides partially encircling the drill body and slidably engaging said side rods, and double acting resilient shock absorbing means between said handle and drill for absorbing shocks in opposite directions transmitted by the drill to said handle and including compression springs encircling said bolt and interposed between the drill and said handle and said guide device.

10. The combination with a mounted drifter type percussive rock drill having guides adapted to slide in a guideway, a feed nut boss and side rods to hold the parts of the drill together, of a spring handle attachment for adapting the drill to manual operation including a sliding connection attached to the feed nut boss and including a sliding bolt passing centrally through the feed nut boss, a manual grasping handle secured to the rear end of said bolt in non-rotative relation to the latter and arranged adjacent the rear end of the drill, a guide device secured to the opposite end of said bolt in non-rotative relation to the latter and including a yoke having side portions passing outside of and around the drill guides partially encircling the drill body and slidably engaging said side rods, and double acting resilient shock absorbing means between said handle and drill for absorbing shocks in opposite directions transmitted by the drill to said handle and including compression springs encircling said bolt and interposed between the drill and said handle and said guide device, and a sleeve member attached within said feed nut boss for guiding said bolt and positioning said springs.

In testimony whereof I affix my signature.

ELMER G. GARTIN.

CERTIFICATE OF CORRECTION.

Patent No. 1,778,553.                          Granted October 14, 1930, to

ELMER G. GARTIN.

It is hereby certified that error appears in the printed specification of the above numbered patent requiring correction as follows: Page 2, lines 18 and 19, beginning with "in" second occurrence, strike out the words "in non-rotative relation thereto" and insert the same to follow "end in line 20, of same claim; and that the said Letters Patent should be read with this correction therein that the same may conform to the record of the case in the Patent Office.

Signed and sealed this 13th day of January, A. D. 1931.

(Seal)                                                            M. J. Moore,
Acting Commissioner of Patents.